United States Patent [19]
Fishburne et al.

[11] 3,838,769
[45] Oct. 1, 1974

[54] LIFT-AND-LAY CONVEYOR

[76] Inventors: Francis B. Fishburne, 24 Summit Dr., Asheville, N.C. 28704; Charles W. Traughber, Jr., 3 Mayfair Dr., Enka, N.C. 28724

[22] Filed: Sept. 7, 1973

[21] Appl. No.: 395,235

[52] U.S. Cl.................................. 198/218, 198/219
[51] Int. Cl............................................. B65g 25/04
[58] Field of Search........... 198/218, 219, 221, 127; 193/35 R, 35 A, 35 SS

[56] References Cited
UNITED STATES PATENTS
| | | | |
|---|---|---|---|
| 1,965,868 | 7/1934 | Vickers............................. | 198/219 |
| 2,400,763 | 5/1946 | Malo................................. | 198/219 |

*Primary Examiner*—James B. Marbert
*Assistant Examiner*—Joseph E. Valenza
*Attorney, Agent, or Firm*—Roylance, Abrams, Berdo & Kaul

[57] ABSTRACT

Conveyor of the type in which an elongated conveyor member, advantageously a channel shaped beam, is located between two spaced parallel supports and operated in rectilinear fashion to lift an article from the supports, advance the article while maintaining it above the supports, and then deposit the article on the supports. Rectilinear operation of the conveyor member is accomplished by means including movable support members which are moved between a first position, in which the support members maintain the conveyor members above the supports, and a second position, in which the conveyor members is held with its upper surface approximately coplanar with the supports. Typically, the supports are at floor level and part of a trough structure, and the movable support members provide rigid support between the conveyor member and the bottom of the trough structure, when the support members are in the second position, so that the conveyor can be traversed by vehicular traffic.

21 Claims, 26 Drawing Figures

LIFT-AND-LAY CONVEYOR

BACKGROUND OF THE INVENTION

In industrial plants, warehouses and the like, it is frequently desirable to move loads both by conveyors and by lift trucks or other wheeled vehicles. In such cases, a conventional conveyor is an obstacle in the path of the vehicle, and it has been the practice either to so design the installation that areas to be travelled by the vehicles avoid the areas traversed by the conveyor, or to provide means to bridge the conveyor in locations to be traversed by vehicles. While such practices have been accepted as necessary, there has been a continuing need for a conveyor which, though effective for its purpose, would not impede vehicular and pedestrian traffic.

Some installations, particularly plants where tobacco is pressed into hogsheads or cases, require conveyors capable of not only delivering the hogshead or case to the pressing station but also rigidly supporting the hogshead or case during the pressing operation. This requirement can be viewed as a need similar to that of keeping the conveyor from being an obstacle to vehicular traffic since, in both cases, it would be optimum to have the conveyor capable of acting, in effect, as a rigid continuation of the floor.

OBJECTS OF THE INVENTION

A general object of the invention is to devise a conveyor which, though fully satisfactory for industrial conveying purposes, can be placed in a condition wherein the exposed portions of the conveyor can serve as a rigid portion of the floor of the building or other structure in which the conveyor is installed.

Another object is to provide a conveyor which, when desired, can be made to constitute an effective portion of the floor of the building in which it is installed, so that lift trucks, other vehicles, and pedestrians can cross the conveyor as if it were not present.

A further object is to provide a conveyor capable of moving articles, such as containers into which tobacco or the like is to be pressed, and also of being converted to a rigid support for the article, so that means in addition to the conveyor need not be provided to withstand the forces of, e.g., the pressing operation.

A still further object is to devise a conveyor of the rectilinear motion type in which the movable structure of the conveyor is rigidly supported in two different positions, with an attendant reduction in stress and strain to which the movable structure is subjected over long periods of use.

Yet another object is to provide a conveyor of the type described which can be constructed at the installation site with a maximum use of commonly available steel stock and a minimum of specially manufactured parts.

SUMMARY OF THE INVENTION

Stated generally, conveyors according to the invention comprise stationary support means defining an elongated trough including two parallel laterally spaced generally coplanar support surfaces extending each along a different side of the trough, an elongated conveyor beam extending lengthwise of the trough, drive means connected to the conveyor beam and arranged to move the beam longitudinally in one direction through a conveying stroke and in the opposite direction through a return stroke, support devices for the conveyor beam which are capable of being moved between a first position, in which the conveyor beam is supported above the coplanar support surfaces and can be moved through its conveying stroke, a second position, in which the support devices rigidly support the conveyor beam in a stationary position in which the upper surface of the beam is presented as an effective continuation of the coplanar support surfaces, and power means for moving the support devices, and a third position, in which the conveyor beam is located below the coplanar support surfaces and therefore out of engagement with any articles thereon and is thus free to be moved through its return stroke.

In order that the manner in which the foregoing and other objects are attained according to the invention can be understood in detail, particularly advantageous embodiments thereof will be described with reference to the accompanying drawings, which form part of the original disclosure hereof, and wherein:

FIGS. 2–2B are longitudinal vertical sectional views which combine to show the conveyor of FIG. 1 with the conveyor beam thereof in rigidly supported, floor-level position;

DETAILED DESCRIPTION OF THE EMBODIMENT OF FIGS. 1-9

FIGS. 1-9 illustrate one particularly advantageous embodiment of the invention as applied, for example, in an installation in which tobacco is pressed into hogsheads, so that there is a need to convey the empty hogsheads to the pressing station, to support the hogsheads against the large downward forces occurring during pressing, and to convey the full hogsheads away from the pressing station, all while keeping the floor clear for vehicular and pedestrian traffic. In such an installation, a conveyor 1, FIG. 2B, is employed to supply the empty hogsheads H which are transferred, as by a pusher 2, to a conveyor 3 extending at right angles to conveyor 1 and passing through the pressing station 4, FIG. 2. Conveyors 1 and 3 both comprise a stationary support means which defines an elongated trough below the level of floor F.

Figure 1:
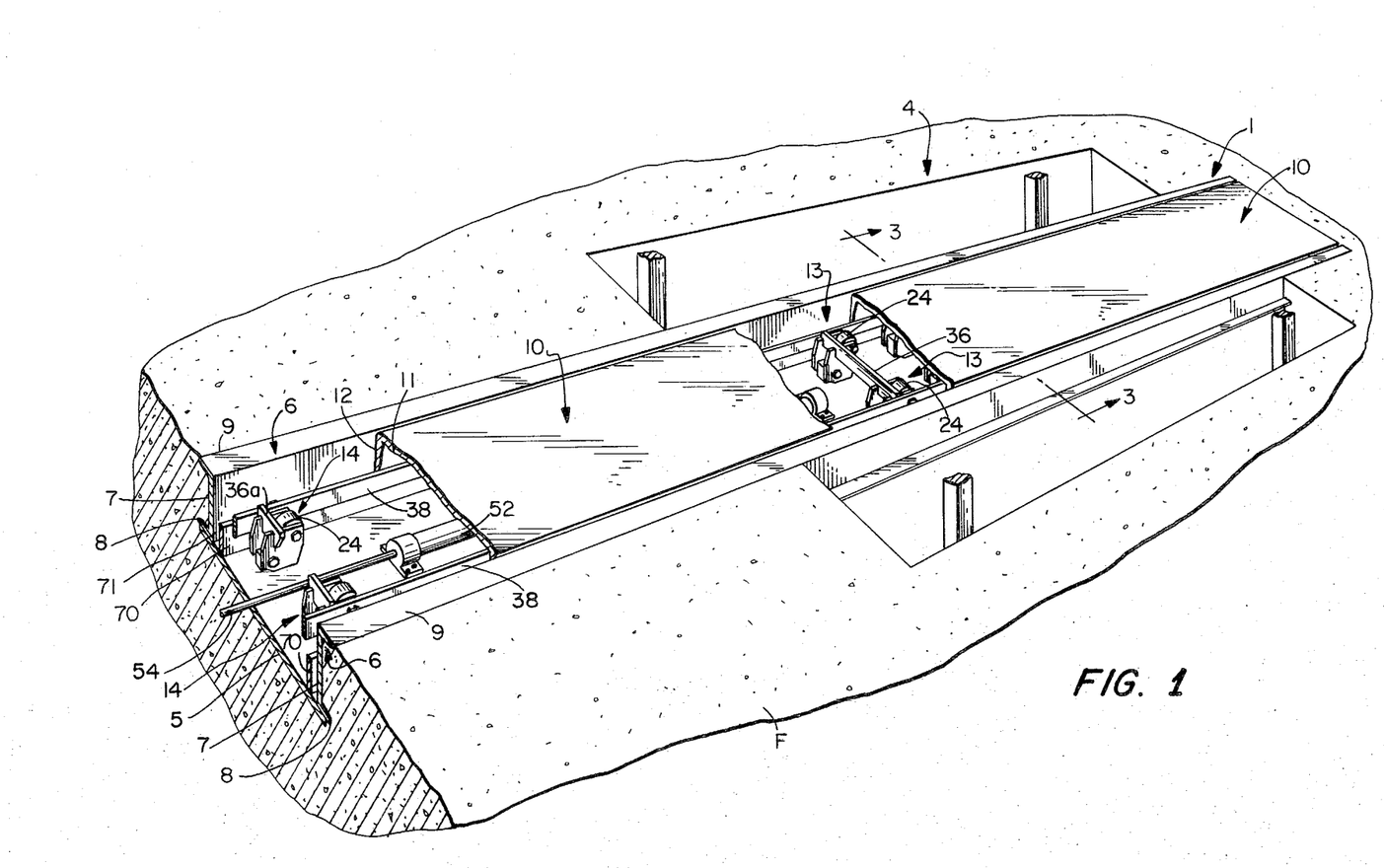
FIG. 1 is a fragmentary perspective view of a conveyor constructed and installed according to one embodiment of the invention.
Figure 3:
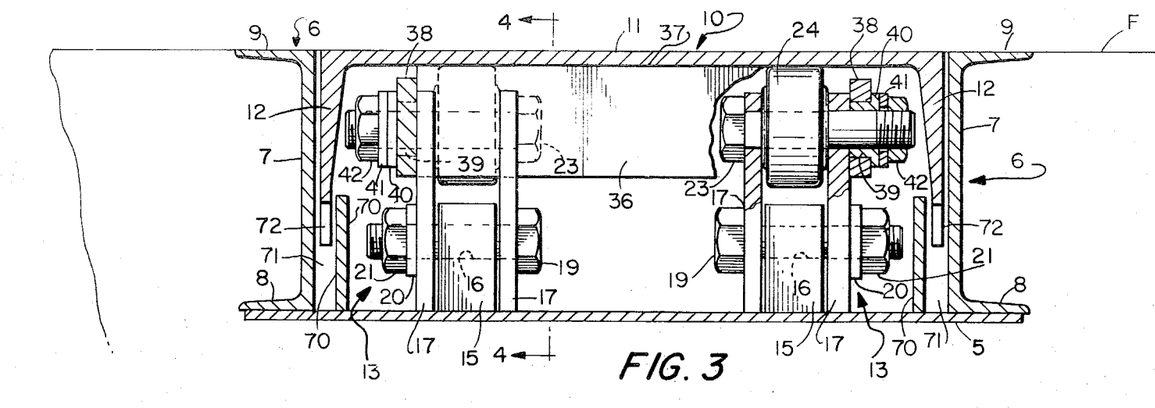
FIG. 3 is a transverse sectional view taken generally on line 3—3, FIG. 1.

Referring particularly to FIGS. 1 and 3, the stationary support means of conveyor 3 is a trough-like structure comprising an elongated flat metal base plate 5 to the respective longitudinal edge portions of which are secured two standard metal channel members 6. The channels of members 6 open outwardly, and the main walls 7 of the two channels are thus opposed across base plate 5 in such fashion that the base plate and walls 7 of the channel members cooperate to form a trough of U-shaped transverse cross section. The channel members are rigidly secured to the base plate in any suitable fashion, as by having one side web 8 of each channel member welded or bolted to the base plate. Base plate 5 and channel members 6 are embedded in the floor F in uch fashion that the upper surfaces of the upwardly disposed web 9 of each channel member are level with the surface of the floor. Thus, the upper surfaces of webs 9 are mutually coplanar and are also coplanar with the surface of floor F.

Conveyor 3 comprises a straight, rigid conveyor beam 10 in the form of a channel member disposed with the main web 11 of the channel horizontal and extending lengthwise of the trough defined by members 5 and 6, and with its side webs 12 depending toward base plate 5. The overall width of beam 10 is only slightly less than the transverse space between walls 7 of members 6, so that the outer face of each web 12 is immediately adjacent to but out of engagement with the corresponding wall 7. Webs 12 of beam 10 are substantially narrower than are the main walls 7 of channel members 6. Thus, beam 10 can descend to bring its main web 11 a substantial distance below floor F without beam 10 engaging base plate 5.

Conveyor beam 10 is supported by a plurality of movable support devices 13, FIGS. 3-4B, and 14, FIGS. 15-16A, all of devices 13 being essentially identical to each other. As best seen in FIG. 3, devices 13 are arranged in pairs, with the support devices of each pair aligned transversely of the conveyor. Each support device 13 is pivotally mounted on a mounting block 15 rigidly secured to base plate 5, blocks 15 having flat parallel vertical side faces and each being provided with a transverse through bore 16. Each device 13 includes two flat rigid plates 17, FIG. 5, which are identical in plan form and are provided with holes 18, the plates being disposed each at a different side of the mounting block 15 and a bolt 19 being passed through the holes 18 in the plates and the bore 16 in the mounting block. The hole 18 in the plate which is nearer the adjacent channel member 6 is tapped for threaded engagement with the bolt, the bolt being arranged with its shank extending outwardly, and this portion of the assembly being completed by a lock washer 20 and nut 21. For each support device 13, bolt 19 serves to mount the support device on the corresponding block 15 for pivotal movement about the horizontal axis defined by the bolt.

Figure 5:
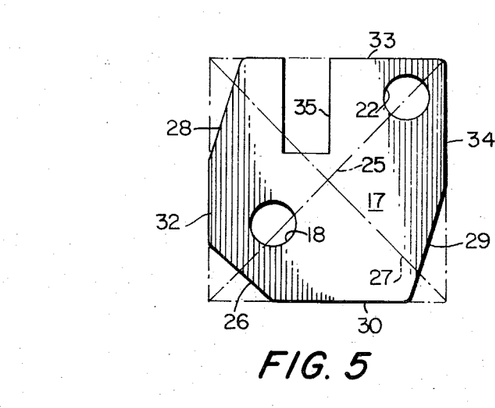
FIG. 5 is a plan elevational view of a plate forming part of the support device shown in FIGS. 4–4B.
Figure 6:
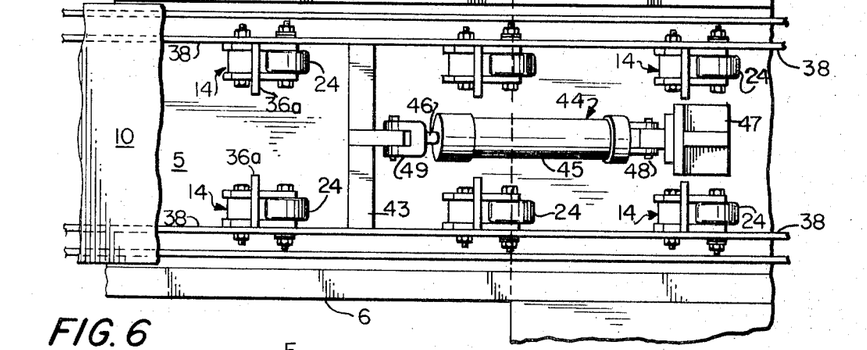
FIGS. 6–6B are top plan elevational views which combine to show the conveyor of FIG. 1.
Figure 6A:
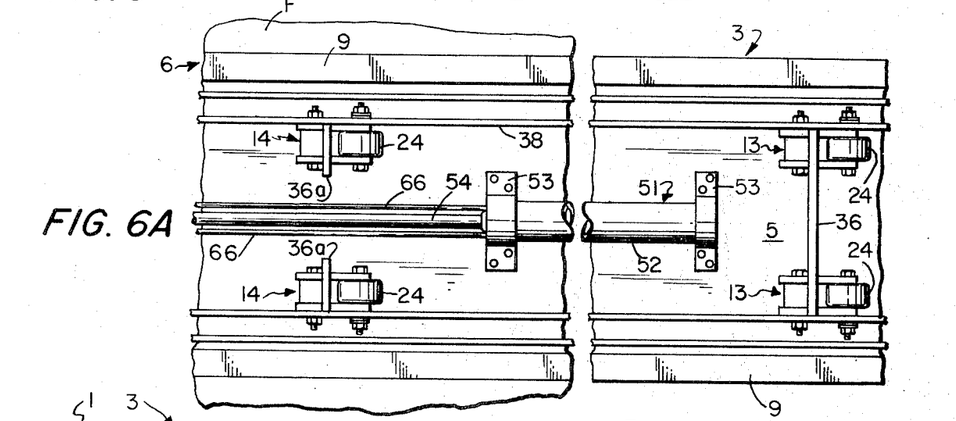
Figure 6B:
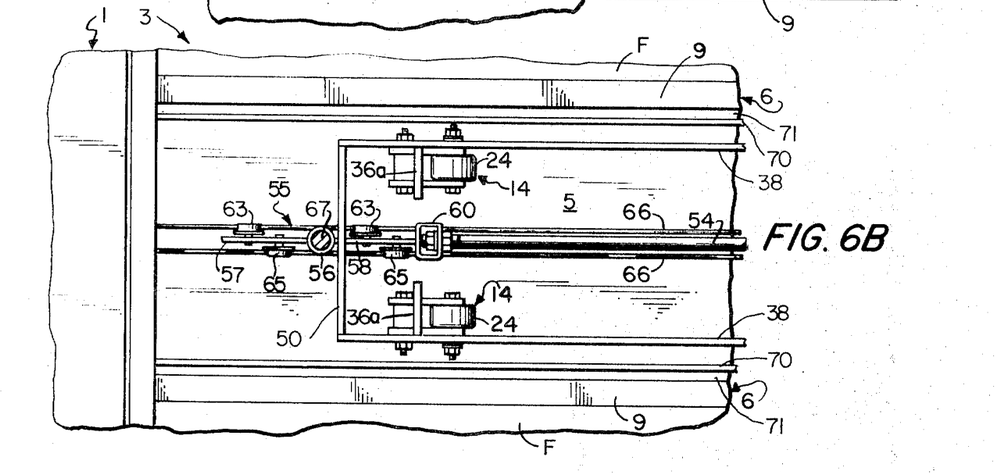

Each plate 17 is also provided with a second circular hole 22 which is spaced radially from the axis defined by bolt 19, holes 22 being aligned transversely of the plates and accommodating a second bolt 23. A roller 24 is located between plates 17 and rotatably supported by bolt 23.

The pivotal mounting for support devices 13 afforded by blocks 15 and bolts 19 can be considered as effective to allow devices 13 to swing between a first position, seen in FIG. 4A and in which rollers 24 project above the floor level; a second position, seen in FIG. 4B and in which rollers 24 are substantially below the floor level; and a third position, seen in FIG. 4. All of the rollers 24 engage the lower face of the main web 11 of conveyor beam 10 and, for all positions of the support devices save that seen in FIG. 4, the rollers 24 combine to provide a low-friction support for the conveyor beam.

As seen in FIG. 5, each plate 17 is made from a rectangular blank having the initial outline indicated in broken lines, the holes 18 and 22 each being located near a different one of two corners of the rectangular blank which lie on a diagonal 25 of the rectangle. The corner portion of the blank nearer hole 18 is cut away to provide a straight edge portion 26. The two corners which lie on the other diagonal 7 of the rectangle are also cut away to provide straight edge portions 28 and 29, respectively. Cutting away of the two corners to provide edges 26 and 29 leaves a straight portion 30 of the corresponding original edge of the rectangular blank. Edge portion 30 extends from edge 29 and intersects edge 26 before reaching the line 31 which is radial with respect to hole 18 and at right angles to edge portion 30. Cutting away of the rectangular blank to provide edges 26 and 28 leaves a straight portion 32 of the corresponding original edge of the rectangular blank. The outline of plate 17 is completed by straight edges 33 and 34 which are portions of the corresponding edges of the original blank, edge 33 being interrupted by a rectangular notch 35 which extends at right angles to that edge and is displaced from hole 18 slightly toward hole 22.

Figure 4:
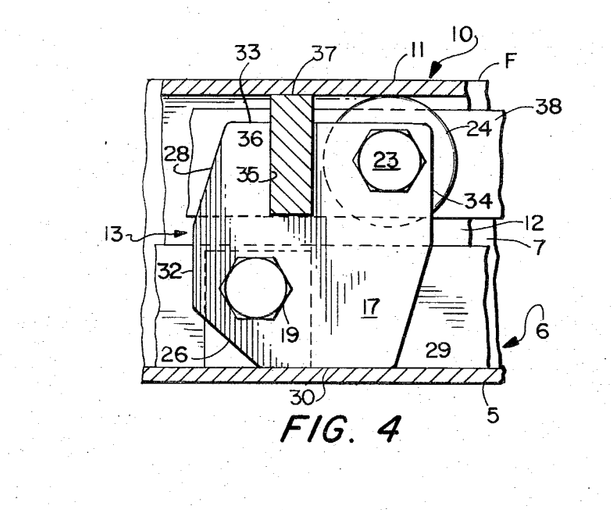
FIG. 4 is a fragmentary vertical sectional view taken generally on line 4—4, FIG. 3, and showing parts in the positions occupied in FIG. 3.

Each aligned pair of support devices 13 includes a support bar 36, FIGS. 1, 3 and 4-4B, which is accommodated by notches 35 in the respective plates 17 and is welded to the plates along the outlines of the notches. Bar 36 is straight, elongated, and of rectangular transverse cross section. As best seen in FIG. 4, the transverse dimensions of bar 36 are such that the bar not only completely fills each notch 35 but also projects therefrom by a distance at least equal to the distance from edge 33 to the exposed periphery of roller 24 along the diameter of the roller at right angles to edge 33. Accordingly, when support device 13 is swung to its second position, with the edges 33 of the plates 17 parallel to the conveyor beam 10, the exposed edge 37 of support bar 36 comes into flush, load-bearing engagement with the lower surface of the main wall 11 of beam 10. And such movement of support device 13 also brings the edge 30 of each plate 17 into flush, load-bearing engagement with plate 5. When support device 13 is in its first position (FIG. 4A) or its third position (FIG. 4B), support bar 36 is out of engagement with the conveyor bearing. In those positions of the support device, only roller 24 engages the main web 11.

Figure 9:
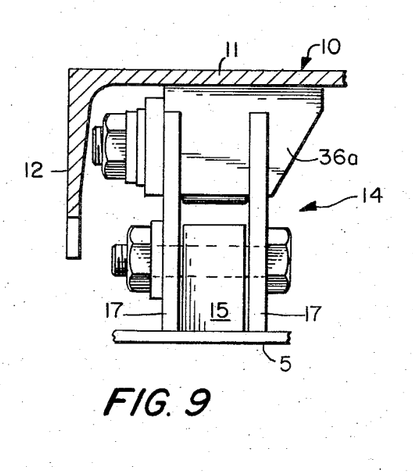
FIG. 9 is a fragmentary transverse sectional view illustrating another form of support device used in the conveyor of FIG. 1.

Support devices 14, FIG. 9, are also arranged in pairs with the support devices of each pair spaced apart transversely of the conveyor. Support devices 14 are identical with devices 13 except that each device 14 is equipped with its own short support bar 36a which bridges the two plates 17 but projects inwardly from the inner plate 17 only a short distance toward the center of the trough.

The pairs of support devices 13 are spaced equally throughout the length of the pressing station 4. The pairs of support devices 14 are spaced apart throughout that portion of conveyor 3 extending from the infeed conveyor 1 to the pressing station and that portion of conveyor 3 extending from the pressing station 4 to the delivery end of conveyor 3, the space between adjacent pairs of the devices 14 being large as compared to the spacing of the pairs of devices 13.

All of the support devices of conveyor 3, including both devices 13 and devices 14, are interconnected by two elongated mutually parallel operating arms 38 which are located below the main web 11 of conveyor beam 10 and extend longitudinally of the trough defined by plate 5 and channels 6. Each arm 38 extends adjacent a different one of the channels 6 and in sliding engagement with the outer face of the outermost plates 17 of the support devices 13 and 14 which are nearer the respective side channel 6. Each arm 38 has a plurality of circular openings 39, FIG. 3, equal in number to the pairs of support devices, openings 39 being so located that each opening accommodates a different one of the bolts 23. Openings 39 are of larger diameter than the bolts, and a plain sleeve bearing 40 is provided between the unthreaded shank of bolt 23 and the wall of the opening 39. Each bolt 23 is also equipped with a lock washer 41 and nut 42. The outer end of sleeve bearing 40 is flanged, and the length of the sleeve slightly exceeds the thickness of the arm 38, so that, though the nut 42 clamps the assembly rigidly, sleeve bearing 40 provides a free pivotal connection between arm 38 and the support device 13 or 14.

Operating arms 38 extend for substantially the entire length of conveyor beam 10. Between pressing station 4 and the delivery end of conveyor 3, a cross member 43, FIGS. 2 and 6, extends transversely between the two operating arms and is secured rigidly thereto. A rectilinear power device 44, typically a hydraulic motor comprising cylinder 45 and piston rod 46, is provided to operate all of the support devices 13,14 simultaneously via the operating arms 38. Cylinder 45 is pivotally mounted on base plate 5 by bracket 47 and clevis 48. The free end of piston rod 46 is pivotally connected to cross member 43, as by clevis 49. At their ends opposite motor 44, arms 38 are rigidly interconnected by a second cross member 50, FIG. 2B.

Figure 2:
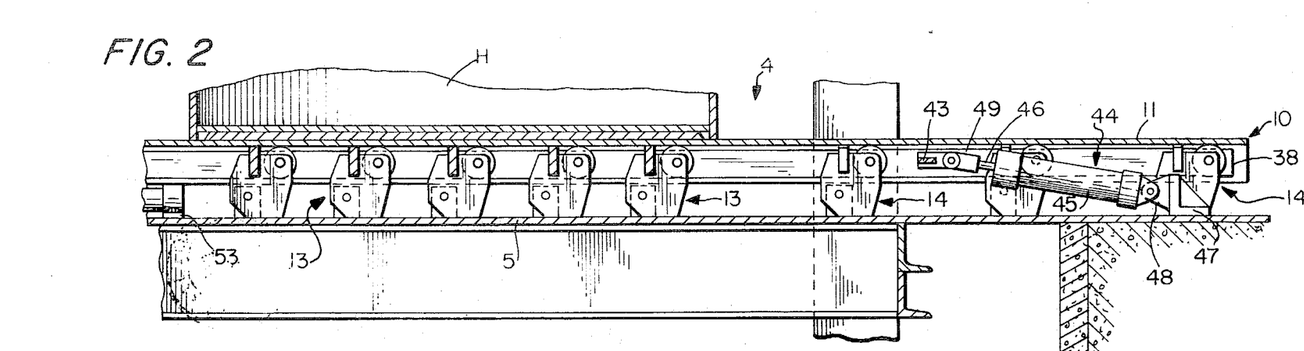
Figures 2A, 2B:
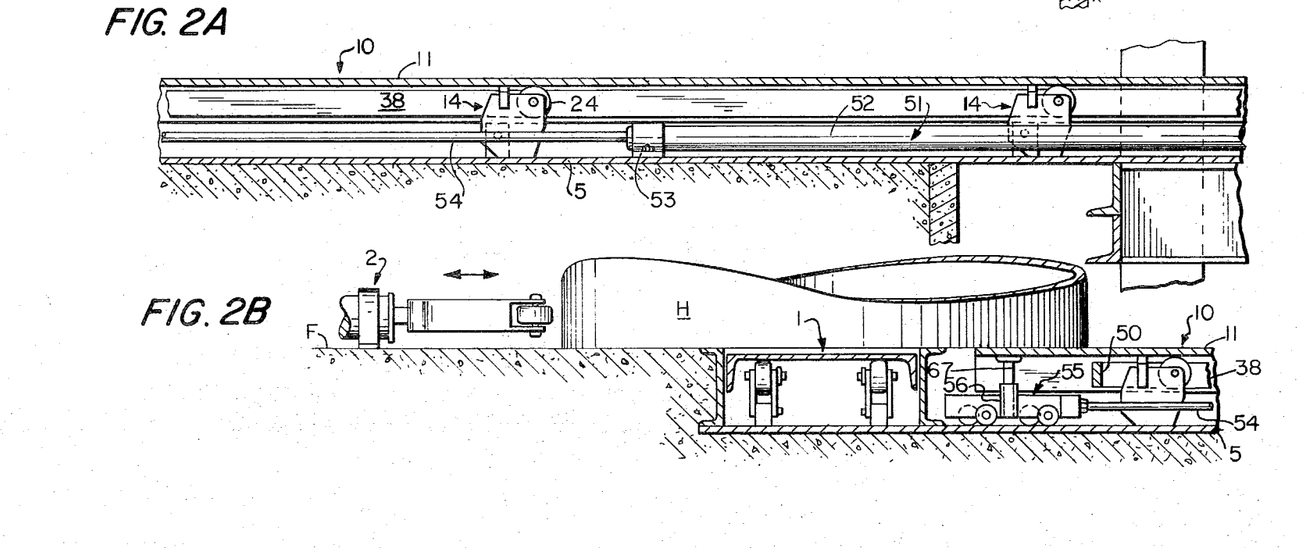

FIGS. 2–2B illustrate motor 44, the operating arm structure including arms 38 and cross members 43 and 50, and the support devices 13,14 in positions achieved by retracting the piston rod 46. Retraction of the piston in the fashion shown in FIGS. 2–2B pivots all of the support devices 13,14 clockwise (as viewed) to their second position, in which support bars 36,36a engage web 11 of the conveyor beam and the edges 30 of all of the plates 17 engage plate 5, so that beam 10, and any load applied thereto, is transferred directly to plate 5 via the combination of bars 36,36a and plates 17. The load-bearing structure presented when the support devices are thus positioned is a direct metal-to-metal structure, with the bearings afforded by bolts 19 and 23 being by-passed. With the support devices 13,14 thus positioned, the upper surface of the main web 11 of conveyor beam 10 is coplanar with the upper surfaces of the top webs 9 of channels 6, and is also coplanar with floor F.

Figure 4A:
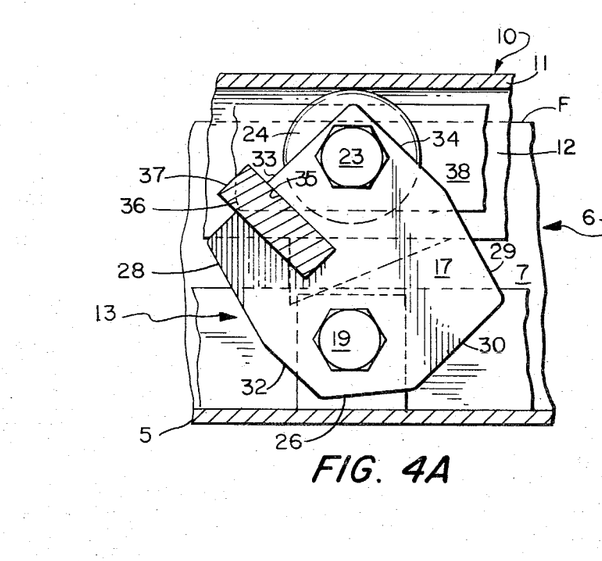
FIG. 4A is a fragmentary sectional view similar to FIG. 4 but showing parts in another set of operational positions.

Operation of motor 44 to extend piston rod 46 serves to move operating arms 38 to the left, as viewed in FIGS. 2–2B, and therefore to pivot all of the support devices 13,14 counterclockwise to their first position, shown in FIG. 4A. Such movement causes the support bars 36,36a to swing out of engagement with beam 10, while the rollers 24 swing upwardly to raise the conveyor beam 10, and any load such as the hogshead H thereon, into a position in which the main web 11 of the beam (and therefore any load carried by the beam) is significantly above the floor F. Further extension of the piston rod 46 causes support devices 13,14 to swing further in the clockwise direction, bringing the support devices into their third position, shown in FIG. 4B. With devices 13,14 in this position, only rollers 24 engage beam 10, and the edges 28 of all of the plates 17 are in direct load-bearing engagement with plate 5. In both the third and first positions of devices 13,14, the support devices provide low-friction rolling support for the conveyor beam, so that the beam is essentially free to be moved lengthwise.

Such lengthwise movement of beam 10 is accomplished by a second rectilinear motor 51, FIGS. 2–2B and 6–6B, which is advantageously a hydraulic motor comprising an elongated cylinder 52, fixed rigidly to plate 5 by brackets 53, and piston rod 54. Motor 51 is mounted on the center line of plate 5 in a location between conveyor 1 and pressing station 4, with the piston rod projecting toward conveyor 1. Only support devices 14 are employed in this location, and the shorter support bars 36a provide free space to accommodate motor 51.

Figure 7:
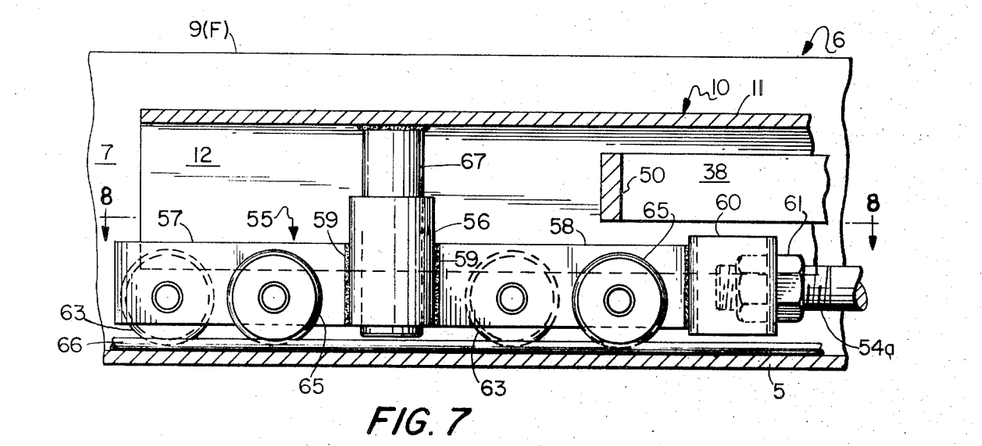
FIG. 7 is an enlarged side elevational view of structure by which the power device for the conveyor beam of the conveyor of FIG. 1 is connected to the conveyor beam.
Figure 8:
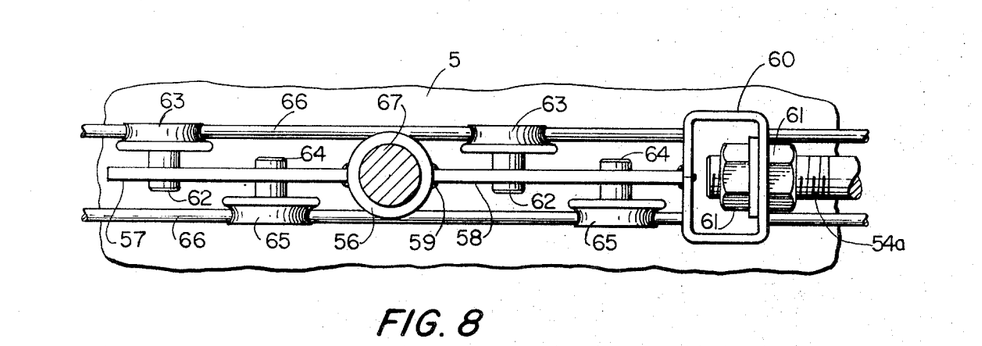
FIG. 8 is a view taken generally on line 8—8, FIG. 7.

The free end of piston rod 54 is rigidly connected to and supported by a dolly 55, FIG. 2, which is shown in detail in FIGS. 7 and 8. The dolly comprises a main frame made up of a vertically disposed right cylindrical tube 56 and two flat rectangular body plates 57 and 58 disposed in a common vertical plane which includes the central axis of the tube, ends of plates 57,58 being welded to the tube as indicated at 59. At its end opposite tube 56, plate 58 is welded to one side of an upright open rectangular coupling 60, the opposite side of the coupling having an opening which accommodates the threaded end portion 54a of piston rod 54, the piston rod being rigidly secured to the coupling by nuts 61. From FIG. 8, it will be seen that the plane occupied by plates 57,58 includes the longitudinal axis of piston rod 54. Each plate 57,58 is provided with two transverse openings. For each plate 57,58 a stub shaft 62 is secured in one of the two openings and projects laterally from the plate, the two stub shafts 62 projecting in the same direction and each carrying a wheel 63. Two additional stub shafts 64 are secured in the remaining openings, project from the plates in the opposite direction, and carry wheels 65. Wheels 63,65 respectively engage two elongated mutually parallel rail members 66 and 67 which are secured to base plate 5 and extend longitudinally along the trough defined by plate 5 and channel 6, the length of the rail members being such as to provide a track for dolly 55 which extends from a point adjacent conveyor 1 to a point beyond the limit of movement of the dolly upon full retraction of the piston rod 54.

A vertical right cylindrical connector pin 67 is welded to the main web 11 of beam 10 adjacent the end of the beam which is nearer conveyor 1. Pin 67 depends from beam 10 and is slidably engaged in tube 56, the relative lengths of the pin and tube being such that the pin is well engaged with the tube in all vertical positions of the conveyor beam, i.e., in the position of FIG. 4A as well as the position of FIG. 4B. Accordingly, the structure shown in FIGS. 7 and 8 serves to couple piston rod 54 to conveyor beam 10 under all operating conditions of the conveyor.

In considering operation of conveyor 3, first assume that operation starts with the parts of the conveyor in the positions shown in FIGS. 2–2B, piston rod 54 being fully extended to position the end of beam 10 immediately adjacent the side of conveyor 1, and the support devices 13,14 occupying their second position so that the top of beam 10 is coplanar with floor F. The hogsheads H to be packed with tobacco are delivered successively by conveyor 1 to a position in which the hogshead is centered with respect to conveyor 3. Pusher 2 is operated to push the hogshead H off of conveyor 1 onto conveyor 3, the hogshead sliding on the coplanar surfaces presented by the upper webs 9 of channels 6 and the main web 11 of beam 10. Motor 44 is then operated to extend its piston rod 46 through a controlled distance such that all of the support devices 13 and 14 are pivoted counterclockwise (as viewed in FIGS. 2–2B) to bring all of the support devices simultaneously to the position shown in FIG. 4A. Such movement of the support devices causes rollers 24 to engage web 11 of the conveyor beam and raise the beam to a position in which web 11, and therefore the hogshead H supported thereby, is spaced above floor F by a significant distance. Since all of the support devices 13,14 are essentially identical and moved simultaneously by arms 38, beam 10 is kept horizontal as it is elevated by the support devices 13,14.

With support devices 13,14 remaining in the position shown in FIG. 4A, motor 51 is operated to fully retract its piston rod 54, thereby moving conveyor beam 10 (and the hogshead H supported thereby) away from conveyor 1 and toward the pressing station 4, the distance through which beam 10 is moved being precisely equal to the retraction of piston rod 54. During such movement, beam 10 is supported only by the rolling engagement of rollers 24, and dolly 55 is supported by rolling engagement of wheels 63,65 with rail members 66. Since beam 10 has been elevated above floor F, the hogshead H supported by the beam is out of engagement with the floor and free to move with the conveyor beam.

Figure 4B:
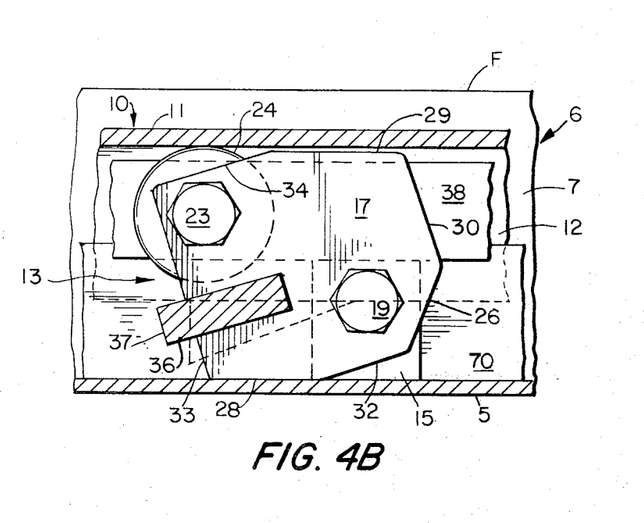
FIG. 4B is a fragmentary sectional view similar to FIG. 4 but showing parts in a third set of positions.

When retraction of piston rod 54 is completed, motor 44 is again operated, to extend its piston rod 46 by an additional amount adequate to swing all of the support devices 13,14 to the position shown in FIG. 4B. Such movement of the support devices causes beam 10 to descend by gravity, following rollers 24, until web 11 of the conveyor beam is spaced well below floor F, descent of the conveyor beam causing the hogshead H carried thereby to be deposited on the coplanar surfaces presented by floor F and the upper webs 9 of channels 6. With all of the support devices 13,14 remaining in the position shown in FIG. 4B, beam 10 is engaged only by rollers 24 and is free to be moved (to the left, as viewed in FIGS. 2–2B) back to its initial position, such movement being accomplished by operating motor 51 to again fully extend its piston rod 54.

Repeating the operating sequence just defined is effective to further advance the hogshead H initially delivered to conveyor 3 by pusher 2. The conveyors 1 and 3 and pusher 2 advantageously are operated in timed relation so that, e.g., a new empty hogshead H is delivered to conveyor 3 each time that piston rod 54 has been extended to move beam 10 back to the longitudinal position shown in FIGS. 2–2B.

The operational stroke of motor 51 and the position of pressing station 4 are so interrelated that, once a hogshead H has been delivered to conveyor 3 by pusher 2, a predetermined number of cycles of operation of conveyor 3 will cause the hogshead to be precisely positioned at station 4, ready to be packed with tobacco by the press (not shown). Preparatory to operation of the press, motor 44 is operated to move the support devices to the position seen in FIGS. 3 and 4. Hence, during the pressing operation, the closely spaced support devices 13 offer solid metal-to-metal support for the portion of beam 10 which supports the hogshead during pressing. Since support bars 36 directly engage web 11 of the conveyor beam, and since the edges 30 of plates 17 directly engage plate 5, the great loads applied to beam 10 by the pressing operation are transferred directly to plate 5, by-passing bolts 19,23.

When support devices 13,14 are maintained in the position shown in FIGS. 3 and 4, beam 10 is held even with floor F, so as to constitute an extension of the floor. Hence, at this time, lift trucks and other traffic can cross the conveyor 3 unimpeded. And, with the support devices 13 and 14 all in their second position, i.e., that shown in FIGS. 3 and 4, all of the loads applied to the conveyor beam by traffic crossing the conveyor is transferred to plate 5, and to the concrete or other structural support therebelow, directly via bars 36 (or 36a) and plates 17, substantially without affecting the pivots at bolts 19 and the rotary supports for rollers 24.

Figure 10:
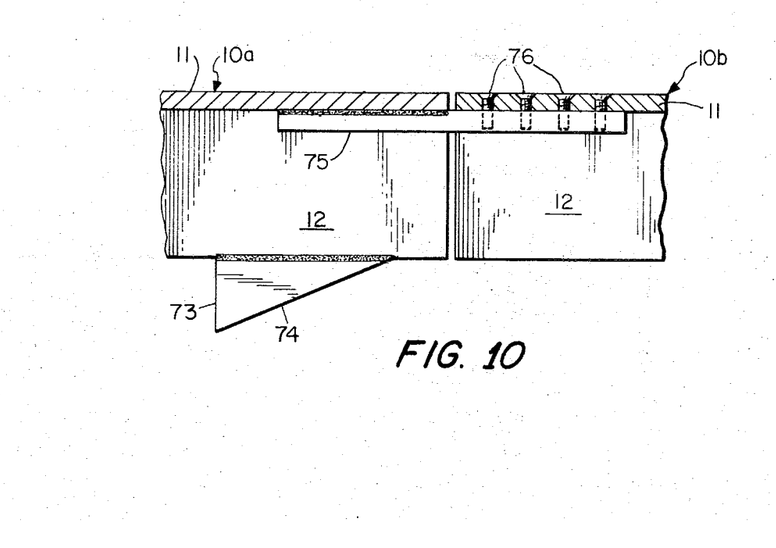
FIG. 10 is a fragmentary longitudinal sectional view showing details of a conveyor beam which can be used in the conveyor of FIG. 1.

Though the conveyor beam 10 constitutes almost a complete cover for the trough defined by plate 5 and channels 6, it is necessary that lateral clearance be provided between flanges 12 and side channels 6. Presence of such clearance allows debris, such as tobacco fragments, to fall into the trough. To prevent such debris from collecting in the areas occupied by support devices 13 and 14, motors 44 and 51, and dolly 55, two elongated portion members 70 are provided, each member 70 being in the form of a flat metal plate having one of its long edges welded to plate 5. Each plate 70 is adjacent and parallel to the main wall 7 of a different one of side channels 6, so that the plate 70 and wall 7 combine to define a narrow trough 71 centered below the corresponding one of the side webs 12 of beam 10. The height of plates 70 is such that, when support devices 13,14 occupy their second position and the upper face of web 11 is therefore coplanar with floor F, plates 70 will project slightly above the lower edges of side webs 12. As best seen in FIG. 10, a plurality of triangular pusher teeth 72 are welded to the lower edges of side webs 12, each tooth 72 having an exposed vertical edge 73 and an exposed inclined edge 74. Teeth 72 are so arranged that vertical edges 73 face toward conveyor 1, while inclined edges 74 face toward the end of conveyor 3 which is opposite conveyor 1. As shown in broken lines in FIG. 4B, lowering of beam 10 to the lowermost position resulting from movement of support devices 13,14 to their third position brings teeth 72 deep into the troughs 71. Accordingly, when motor 51 is operated to extend piston rod 54 and drive the conveyor beam 10 toward conveyor 1, the vertical edges 73 of teeth 72 engage any debris which has collected in troughs 71 and sweep the debris toward the end of conveyor 3 which is nearer conveyor 1. The debris deposited there can be removed manually.

Figures 11, 12:
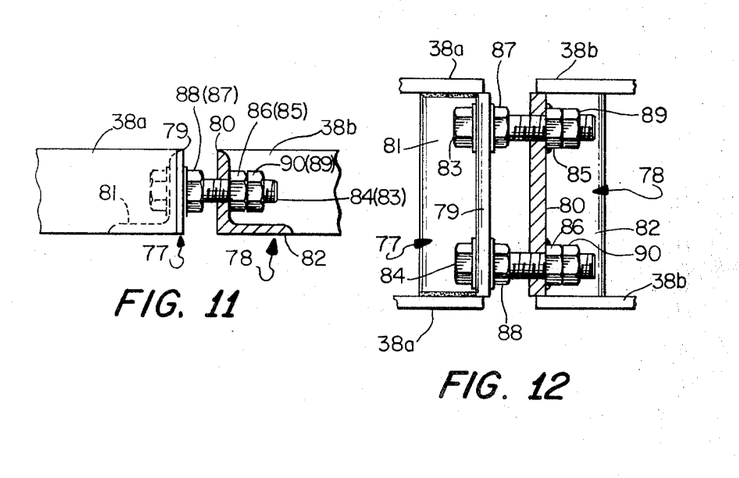
FIG. 11 is a fragmentary side elevational view, with parts broken away for clarity, illustrating the manner in which the operating structure for the support devices can be made up of rigidly connected sections.
FIG. 12 is a top plan view of the structure shown in FIG. 11.

The conveyor beam 10 can vary in length from a relatively few feet to hundreds of feet. For optimum use of standard steel stock, beam 10 can be fabricated from standard lengths of channel stock connected end-to-end in the manner shown in FIG. 10. A connector plate 75 is disposed beneath the adjacent ends of the main webs 11 of two portions 10a and 10b of the beam, plate 75 being welded to portion 10a and secured to portion 10b by countersunk machine screws 76. Similarly, for longer conveyors, operating arms 38 can be made up of sections of standard stock, with the sections interconnected rigidly in the manner shown in FIGS. 11 and 12. Here, each operating arm comprises two sections 38a and 38b, like ends of the sections 38a being rigidly interconnected by a transverse member 77, FIG. 12, of right angle cross section, and like ends of the sections 38b being rigidly interconnected by transverse member 78. Members 77,78 are so arranged that one web 79,80 is vertical and the other web 81,82 projects back along the arm member sections 38a and 38b, respectively. Webs 79,80 are provided with two sets of aligned openings to accommodate bolts 83 and 84, respectively. Nuts 85 and 86 are welded to web 80 and cooperate with the respective ones of bolts 83,84 to provide an adjustable connection between the two operating arm sections. Additional nuts 87–90, FIG. 12, are provided to secure the connection after adjustment.

Figure 15:
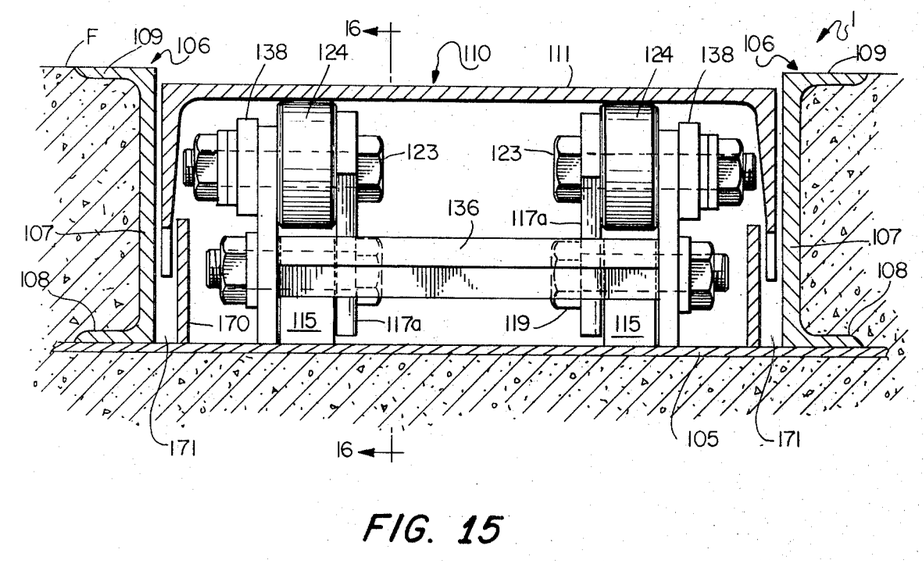
FIG. 15 is a transverse sectional view taken generally on line 15—15, FIG. 13A.

The embodiment of the invention described with reference to FIGS. 1–9 is particularly advantageous because the upper face of beam 10 is precisely coplanar with the floor when the support devices for the beam are in their second position. Such a precisely coplanar relationship is not essential, however, and FIGS. 13–16A illustrate another embodiment which, for example, can be used for conveyors called on to perform in the manner required for conveyor 1, FIG. 2B, where the conveyor need not withstand loads of the order of magnitude encountered during, e.g., pressing of tobacco into hogsheads. In this embodiment, as shown in FIG. 15, the same trough-forming stationary support means used in conveyor 3 can be employed, i.e., an elongated flat base plate 105 and two side channels 106 each having a vertical main wall 107, a bottom web 108 welded to plate 105, and a top web 109 the upper face of which is coplanar with floor F. Conveyor beam 110 is identical to beam 10 and includes a flat main web 111 and side webs 112, the side webs being equipped with debris-clearing teeth 172 which depend into the narrow troughs 171 defined by plates 170 and walls 107.

Conveyor beam 110 is carried by a plurality of identical support devices 113 each comprising a mounting block 115 which is rigidly secured to plate 105, a plate 117, a bar 117a, and a roller 124, the combination of plate 117 and bar 117a being pivoted to block 115 by a bolt 119, and roller 124 being mounted on plate 117 and bar 117a by a bolt 123. Plate 117 is rectangular, having a lower edge 130, FIGS. 16 and 16A, an upper edge 133, and side edges 132,134. The hole in plate 117 which accommodates bolt 119 is so located that, with the support device 113 occupying the position shown in FIG. 16, edge 130 is in flush load-bearing engagement with plate 105. The corner which would be defined by edges 130 and 134 is cut away, as indicated at 129, to allow the plate to swing clockwise (as viewed in FIGS. 16 and 16A) about the horizontal axis afforded by bolt 119. Bolt 123 is so located that roller 124 projects radially beyond the corner of plate 117 defined by edges 132 and 133. Bar 117a is of elongated rectangular plan form and of such length as to clear plate 105, as the support device is pivoted about the axis defined by bolt 119, and not to project beyond the periphery of roller 124. The support devices 113 are arranged in pairs, with the support devices of each pair spaced apart transversely of the conveyor and interconnected by a cross bar 136. For each pair of support devices, the bar 136 has its ends welded to the respective plates 117 and is also welded to the appropriate edges of the respective bars 117a. Bars 136 are located below bars 117a when the support devices are in the positions shown in FIG. 16.

Support devices 113 are operated by two operating arms 138 which are pivotally connected to the support devices by the roller support bolts 123, as hereinbefore described with reference to support devices 13,14 of the first embodiment. At one end of the conveyor, arms 138 are rigidly interconnected by a cross member 143, FIG. 13. A first hydraulic motor 144 has its cylinder 145 mounted on bracket 147 by clevis 148, the piston rod 146 of the motor being connected to cross member 143 by a clevis 149. Since conveyor 1 can be greatly elongated, additional motors can be employed to operate arms 138, and one such motor is shown at 144a, FIG. 13A. Motor 144a includes a cylinder 145a which is mounted below the conveyor beam by bracket 147a and clevis 148a. Piston rod 146a is connected by a clevis 149a to a cross member 143a which extends between and is welded to arms 138.

Figure 13:
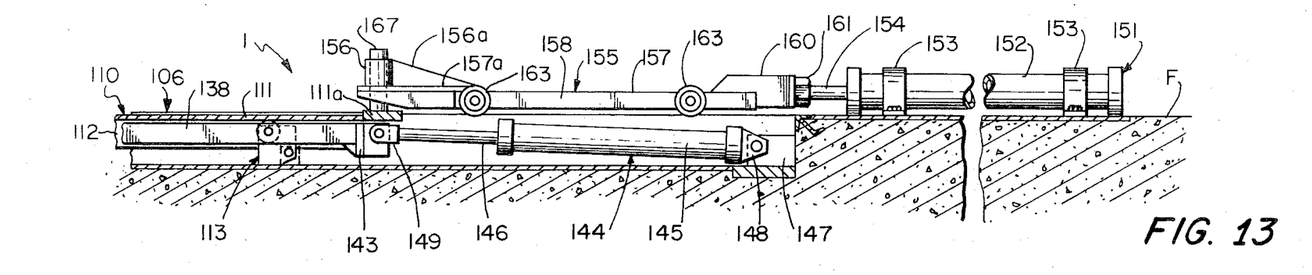
FIGS. 13 and 13A are longitudinal vertical sectional views which combine to show a conveyor according to another embodiment of the invention.
Figure 13A:
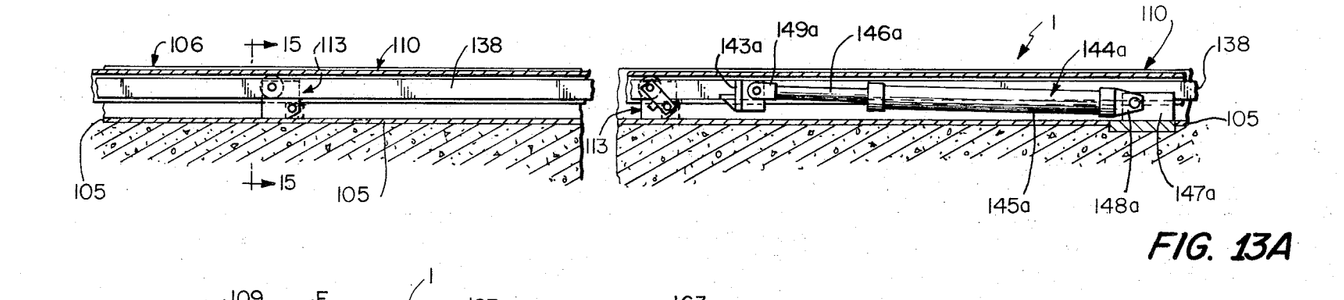
Figure 14:
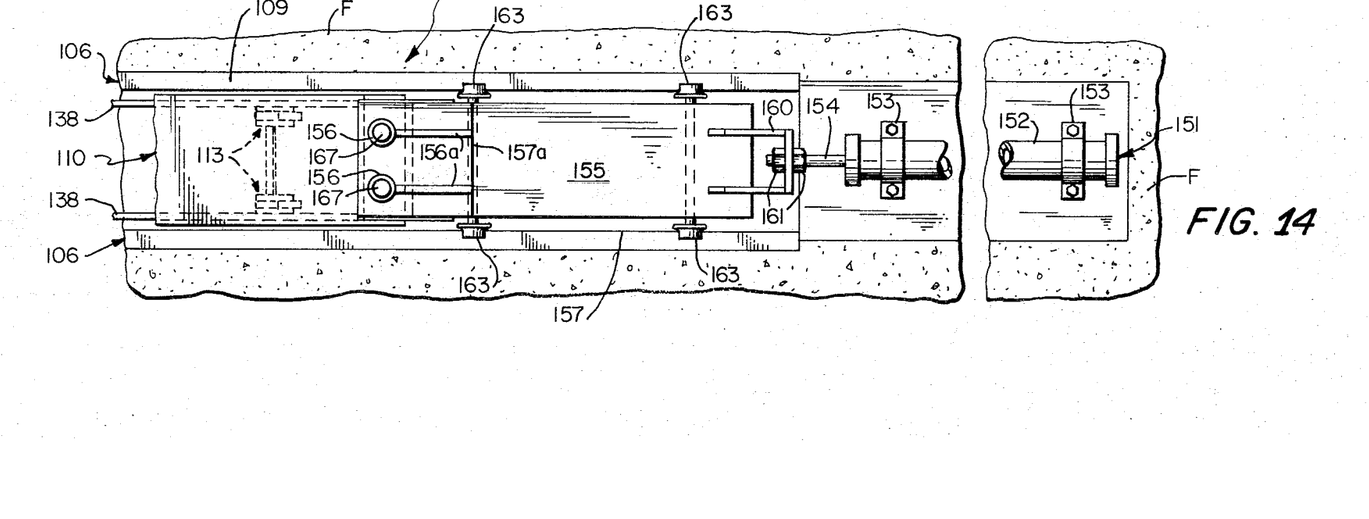
FIG. 14 is a top plan elevational view of a portion of the conveyor of FIGS. 13 and 13A.

In this embodiment, conveyor beam 110 is driven by a hydraulic motor 151, FIG. 13, which comprises a cylinder 152 secured to floor F by brackets 153, motor 151 being disposed adjacent one end of the trough defined by plate 105 and side channels 106, the cylinder 152 having its central axis lying in the same vertical plane as the longitudinal center line of the trough. Piston rod 154 of motor 151 is connected to a dolly 155 by coupling 160 and nuts 161, FIG. 14, the nuts cooperating with the threaded end portion of the piston rod and the transverse member of the generally U-shaped coupling. Dolly 155 comprises a rectangular horizontal body 157 formed of channel stock and disposed with the side webs 158 of the channel depending, as will be clear from FIG. 13. Flanged supporting wheels 163 are mounted on side webs 158 for free rotation and engage the upper webs of channels 106 so that the channels 106 serve as rails to support dolly 155. The forward end of body 157 is reinforced by a plate 157a and carries two upright right cylindrical tubes 156 each braced by plates 156a, there being openings in body 157 and plate 157a which are aligned respectively with tubes 156 and allow the tubes to be slidably engaged over two connector pins 167 which project upwardly from and are rigidly mounted on a transverse bar 111a, FIG. 13, which defines the adjacent end of conveyor beam 110. When motor 151 is operated either to extend or retract its piston rod 154, dolly 155 is moved in the same direction and through the same length of travel as the piston rod, and such movement is imparted to conveyor beam 110 via the connection afforded by tubes 156 and pins 167, the relative lengths of pins 167 and tubes 156 being such that the pins remain engaged in the tubes regardless of the vertical position to which the conveyor beam has been moved by support devices 113.

Figure 16:
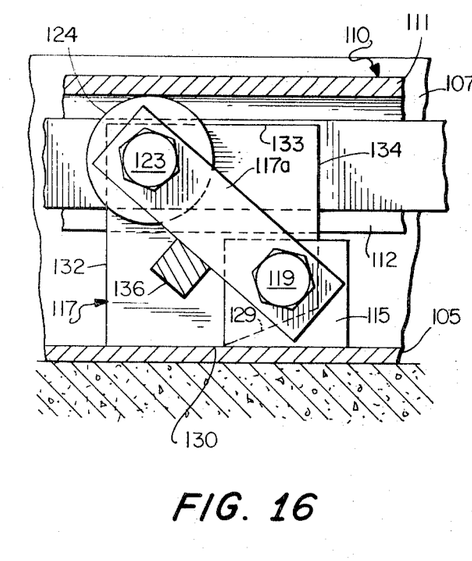
FIG. 16 is a vertical sectional view taken generally on line 16—16, FIG. 15.
Figure 16A:
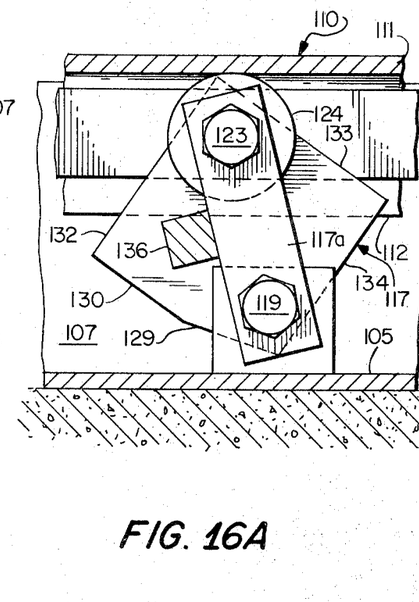
FIG. 16A is a view similar to FIG. 16 but showing parts in another operative position.

Support devices 113 can be moved to a first position, shown in FIG. 16A, in which rollers 124 support conveyor beam 110 with its main web 111 significantly above the horizontal plane of floor F and the webs 109 of side channels 106. The support devices can also swing (counterclockwise as viewed in FIGS. 16 and 16A) to a second position, shown in FIG. 16, wherein rollers 124 support beam 110 with its web 111 slightly below floor F, and edges 130 of plates 117 are in load-bearing engagement with plate 105. Though, when the support devices 113 are in their second position (FIG. 16), web 111 of beam 110 is sufficiently below floor F to assure that the conveyor beam will not engage loads, such as the hogsheads H, resting on the floor, web 111 can be considered as approximately at floor level from the standpoint of allowing wheeled vehicles to traverse the conveyor.

In operation of conveyor 1, loads are delivered to the conveyor when beam 110 is in its second position, FIG. 16, so that the loads initially rest upon floor F and flanges 109 of side channels 106. Motor 151 is operated to extend its piston rod 154 while the support devices and beam 110 are in the positions shown in FIG. 16 and the beam therefore free to move independent of any load present at floor level. Motors 144 and 144a are then operated simultaneously to retract their piston rods through a predetermined short distance, moving arms 138 correspondingly (to the right as viewed in FIGS. 13, 13A), and thereby swinging all of the support devices 113 simultaneously in a counterclockwise direction, as viewed in FIGS. 16 and 16A, to bring the support devices to their first position, shown in FIG. 16A. Such movement causes support beam 110 to engage beneath the hogshead or other article and lift the same clear of the floor F and side channels 6. Motor 151 is then operated to retract its piston rod, moving the conveyor beam 110, and any load supported thereby, to the right, as viewed in FIGS. 13-14. Motors 144,144a are then operated simultaneously to extend their piston rods by that amount required to pivot all of the support devices 113 simultaneously from the position shown in FIG. 16A to the position shown in FIG. 16. During such pivoting of the support devices, conveyor beam 110 descends below the level of the floor F, so that any loads supported by the conveyor beam are deposited again on floor F and side channels 106. When the support devices reach their second (FIG. 16) position, the conveyor is ready for a repeat of the complete cycle of operation, commencing with operation of motor 151 to extend its piston rod and drive beam 110 to the left, as viewed.

Considering FIG. 16A, it will be noted that, when support device 113 is in its first position, the axis of rotation of roller 124 has stopped short of coming into vertical alignment above the pivotal axis defined by bolt 119. Accordingly, the weight of beam 110, and any load supported thereby, tends to urge the support devices to return to the position shown in FIG. 16. The support devices are retained in the FIG. 16A position only because, operation of motors 144,144a having terminated, the pistons of those motors are hydraulically restrained against movement in the cylinders. When motors 144, 144a are placed in operation to drive arms 138 to the left, as viewed, the biasing action of the weight of beam 110 makes it unnecessary for motors 144,144a to overcome any static load.

Figure 17:
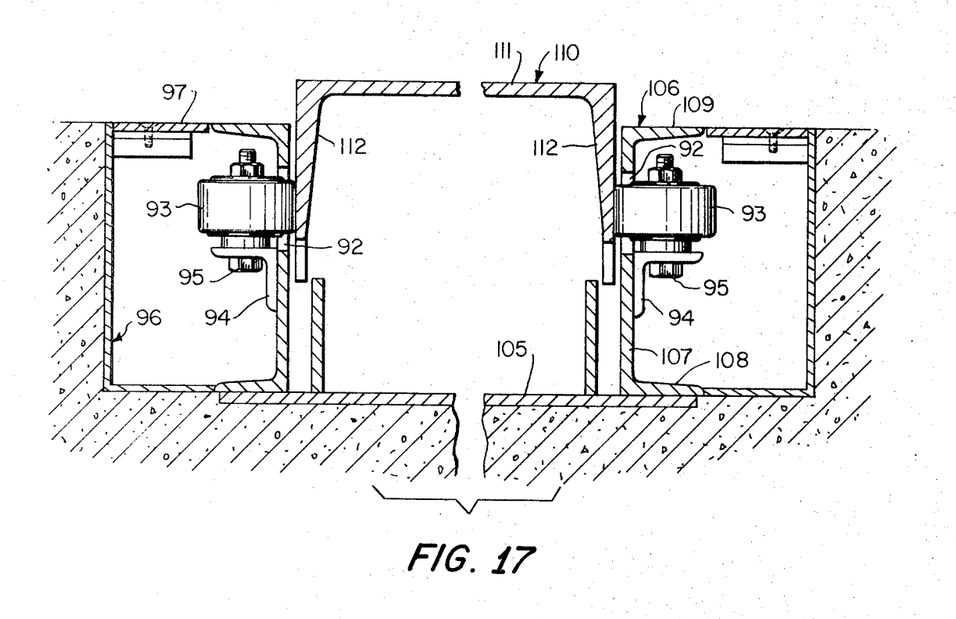
FIG. 17 is a transverse sectional view illustrating the manner in which beam-stabilizing rollers can be employed in the embodiments of FIGS. 1-9 and 13-16A.

Since beam 110 can be of relatively great length and weight, so that large driving forces are applied by motor 151, it is advantageous to provide lateral stabilization, in the manner shown in FIG. 17, to assure that the beam will not come into rubbing contact with side channels 106. At a plurality of points spaced along the conveyor, openings 92, FIG. 17, are provided in the main walls 107 of the side channels. For each opening 92, a roller 93 is provided, the roller being supported, by bracket 94 and bolt 95, for rotation about a vertical axis, brackets being so located and dimensioned that roller 93 lightly engages the adjacent web 112 of beam 110. Since side channels 106 are normally embedded in, e.g., a concrete floor, a box 96 is provided around each roller installation, box 96 being closed by a removable cover plate 97. Side stabilizing rollers can be incorporated in the same manner in the embodiment represented by conveyor 1.

Figure 18:
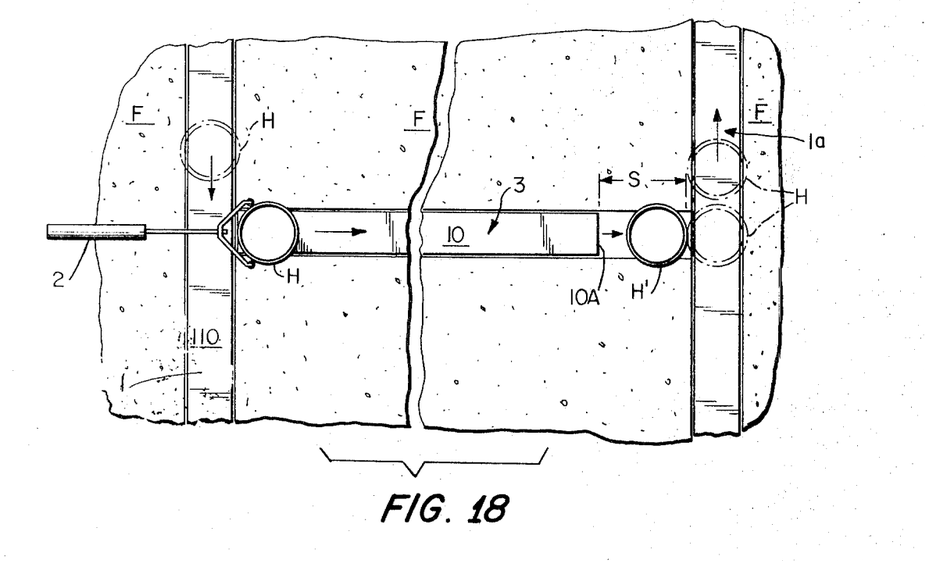
FIG. 18 is a semidiagrammatic plan view of a conveyor system according to the invention.

FIG. 18 illustrates a typical system of conveyors according to the invention, comprising conveyor 1 arranged to deliver, e.g., empty hogsheads H; conveyor 3, onto which the empty hogsheads are transferred by pusher 2; and conveyor 1a, to which the hogsheads are delivered by conveyor 3. As to conveyor 1, it will be understood that the length of the conveying stroke can be such that each hogshead H carried by beam 110 will be approximately centered relative to pusher 2 at the end of a conveying stroke of the beam 110. Conveyor 3 is so dimensioned and arranged that, after the hogsheads H have been filled, one or more additional conveying strokes of beam 10 will bring the filled hogshead to a position which is adjacent conveyor 1a and spaced therefrom by a distance less than the length of the conveying stroke S of beam 10. When beam 10 is lowered to start the next cycle of operation of conveyor 3, the filled hogshead will be deposited on the support afforded by side channels 6, FIG. 3, and floor F, and beam 10 is then moved to the position shown in FIG. 18, so that the end 10a of beam 10 is spaced from the hogshead. Continuing operation of conveyor 3 then causes beam 10 to be raised above the level of floor F and then moved (to the right, as viewed) through its conveying stroke, such movement causing end 10a to engage the hogshead H' and push it onto conveyor 1a. Conveyor 1,3 and 1a are operated in timed relation to assure that, e.g., the conveying beam of conveyor 1a will be depressed when the hogshead H' is pushed onto conveyor 1a by beam 10 of conveyor 3.

Though the invention has been described with reference to conveying articles such as hogsheads, it will be understood that conveyors according to the invention can convey any article which is larger than the width of the trough in which the conveyor beam operates.

What is claimed is:

1. In a conveyor, the combination of stationary support means defining an elongated trough and including two substantially coplanar support surfaces extending each along a different side of the trough at the mouth thereof;

an elongated rigid conveyor beam extending lengthwise of the trough;

a plurality of support devices spaced along the trough beneath the conveyor beam and engageable therewith; each of said support devices comprising mounting means mounting the support device on said stationary support means for movement between a first position, in which the support device engages the conveyor beam and supports the same above the coplanar support surfaces of said stationary support means, and a second position, in which the support device engages the conveyor beam and supports the same with the upper surface of the beam approximately coplanar with the support surfaces of said stationary support means, and rigid means disposed to come into load-bearing engagement with a part of said stationary support means when the support device is moved into said second position;

drive means connected to the conveyor beam to move the same longitudinally in one direction, through a conveying stroke, when said support devices are in said first position and in the opposite direction, through a return stroke, when said support devices are in another position; and power means connected to said support devices for moving said support devices simultaneously to said positions;

said coplanar support surfaces being effective to support articles to be conveyed, movement of said support devices to said first position causing the conveyor beam to engage the articles and lift the articles above said support surfaces preparatory to a conveying stroke, movement of said support devices downwardly from said first position causing the conveyor beam to deposit the articles again on said support surfaces, support of the beam by said support devices when said support devices are in said second position making the conveyor capable of being traversed by vehicular traffic.

2. The combination defined in claim 1, wherein each of said support devices comprises a rigid body, said mounting means supporting said body for pivotal movement about an axis spaced below said coplanar support surfaces, and a support roller mounted on said body for rotation in a location spaced radially from said axis, said roller being so positioned on said body as to engage and support the conveyor beam when the support device is in said first position.

3. The combination defined in claim 2, wherein said axis of pivotal movement is transverse to the trough defined by said stationary support means; and said roller is mounted on said body for rotation about an axis parallel to said pivotal axis.

4. The combination defined in claim 2, wherein said body comprises a rigid member lying in a plane at right angles to said axis of pivotal movement and said rigid member has an edge disposed to come into load-bearing engagement with the bottom of the trough defined by said stationary support means when the support device is moved to said second position.

5. The combination defined in claim 2, wherein each of said support devices further comprises a rigid projection mounted on said body and positioned to come into load-bearing engagement with the conveyor beam when the support device is moved to said second position.

6. The combination defined in claim 5, wherein said body of each of said support devices includes an edge which is located generally across said axis of pivotal movement from said rigid projection, the radial distance from said axis to said edge being such that, as said body completes its movement to said second position to bring said projection into engagement with the conveyor beam, said edge is moved into load-bearing engagement with the bottom of the trough defined by said stationary support means, whereby movement of the support device to said second position causes loads applied to the conveyor beam to be supported by the bottom of the trough directly via the combination of said body and said projection.

7. The combination defined in claim 6, wherein said stationary support means is embedded in a concrete floor structure with said coplanar support surfaces approximately at floor level and the floor structure including structure located beneath and in supporting relation to the bottom of the trough.

8. The combination defined in claim 2, wherein said support devices are arranged in pairs with the pairs of support devices spaced longitudinally along the trough defined by said stationary support means, and the support devices of each pair spaced apart transversely of the trough;

said axis of pivotal movement of each support device is transverse to the trough;

the combination further comprising a plurality of rigid support bars each interconnecting the support devices of a different one of said pairs of support devices, each of said bars extending transversely of the trough and having each of its ends rigidly secured to said rigid body of the respective one of the support devices of the pair of support devices, each of said bars being disposed to come into load-bearing engagement with the conveyor beam when the respective rigid bodies are moved to said second position.

9. The combination defined in claim 2, wherein said rigid body comprises two flat plates arranged in spaced parallel relation,
a first transverse shaft member forming part of said mounting means, and
a second transverse shaft member mounting said support roller between said plates,
said shaft members extending between said plates and securing said plates rigidly together;

said plates each having an edge disposed to come into load-bearing engagement with the bottom of the trough defined by said stationary support means when the support device is moved to said second position.

10. The combination defined in claim 2, wherein said support roller of each of said support devices is mounted on said rigid body by a shaft member which extends transversely of the trough defined by said stationary support means; and said power means comprises
an operating rod extending lengthwise of the trough and connected to said roller shaft members, and
a power device connected to said operating rod.

11. The combination defined in claim 2, wherein said support devices are arranged in pairs with the pairs of support devices spaced longitudinally along the trough defined by said stationary support means, and the support devices of each pair spaced apart transversely of the trough;

said axes of pivotal movement are mutually parallel and transverse to the trough; and said power means comprises
two operating rods extending lengthwise of the trough, one of said rods being pivotally connected to the rigid bodies of the ones of said support devices nearer one side wall of the trough, the other of said rods being pivotally connected to the rigid bodies of the ones of said support devices nearer the other side wall of the trough, and
a power device connected to said operating rods.

12. The combination defined in claim 2, wherein said drive means comprises a pressure fluid-operated rectilinear motor having a piston rod and arranged with said piston rod extending longitudinally of the trough defined by said stationary support means,
a wheeled support connected to and supporting the end of said piston rod, and
coupling means interconnecting said wheeled support and said conveyor beam, said coupling means comprising a vertical pin carried by one of said wheeled support and said conveyor beam, and a coupling member carried by the other of said wheeled support and said conveyor beam, said coupling member having an aperture slidably embracing said pin, and the effective lengths of said pin and aperture being such that said pin is engaged in said aperture for all positions of said support devices.

13. The combination defined in claim 12, wherein said rectilinear motor is disposed in the trough defined by said stationary support means, with said piston rod located below the conveyor beam; and said pin is carried by said wheeled support and projects upwardly therefrom.

14. The combination defined in claim 13, wherein said rectilinear motor is located intermediate the ends of the conveyor beam.

15. The combination defined in claim 14, wherein said coupling means is located at one end of the conveyor beam.

16. The combination defined in claim 15, wherein said power means comprises operating rod means extending lengthwise of the trough and pivotally connected to said support devices, and
a second pressure fluid-operated rectilinear motor located in the trough at the other end of the conveyor beam and including a piston rod extending generally lengthwise of the trough, the piston rod of said second motor being operatively connected to said operating rod means.

17. The combination defined in claim 15, wherein said support devices are arranged in pairs with the pairs of support devices spaced longitudinally along the trough defined by the stationary support means, and the support devices of each pair spaced apart transversely of the trough;

said axes of pivotal movement are mutually parallel and transverse to the trough;

said operating rod means comprises two mutually parallel elongated rods extending lengthwise of the trough beneath the conveyor beam and spaced apart transversely of the trough;

one of said rods being pivotally connected to the rigid bodies of the ones of said support devices nearer one wall of the trough, the other of said rods being pivotally connected to the rigid bodies of the ones of said support devices nearer the other wall of the trough; and said first-mentioned rectilinear motor being centered between the transversely spaced support devices of said pairs of support devices.

18. The combination defined in claim 2, wherein said rigid body is angularly displaced from the vertical toward said second position when the support device is in said first position, whereby the weight of said conveyor beam biases said support devices toward said second position.

19. The combination defined in claim 1, wherein said support devices are mounted for pivotal movement, each about an axis transverse to the trough defined by said stationary support means, said support devices each comprise a roller mounted for free rotation about an axis parallel to and spaced from the axis of pivotal movement of the support device, the axis of rotation of said roller being aligned substantially above said pivotal axis when the support device is in said first position;

said support devices being pivotable in one direction from said first position to said second position and in the opposite direction from said first position to a third position in which the conveyor beam is located a substantial distance below said coplanar support surfaces, the rollers of said support devices engaging and supporting said conveyor beam when the support devices are in said first and third positions, said support devices each comprising a rigid member disposed to come into load-bearing engagement with said conveyor beam only when the support device is moved to said second position.

20. The combination defined in claim 19, wherein said support devices each comprise rigid means disposed to come into load-bearing engagement with a part of said stationary support means when the support device is moved to said third position.

21. The combination defined in claim 1, wherein said conveyor beam is of U-shaped transverse cross section and includes a main web and side webs with the side webs depending from the main web into said trough; and said stationary support means comprises wall means defining two narrow debris-receiving troughs, each of said side webs depending into a different one of said debris-collecting troughs, said side webs being equipped with teeth arranged to move debris lengthwise of said debris-collecting troughs as said conveyor is moved longitudinally in one direction.

* * * * *